Sept. 16, 1969 R. SIEGEMUND 3,467,342

GUIDE DEVICE FOR TAPE-LIKE RECORDING CARRIER

Filed Dec. 13, 1967

INVENTOR

Richard Siegemund

By Ernest G. Montague

Attorney

United States Patent Office 3,467,342
Patented Sept. 16, 1969

3,467,342
GUIDE DEVICE FOR TAPE-LIKE RECORDING CARRIER

Richard Siegemund, St. Georgen, Germany, assignor to Dual Gebruder Steidinger, St. Georgen, Black Forest, Germany, a corporation of Germany Filed Dec. 13, 1967, Ser. No. 690,209
Claims priority, application Germany, Dec. 19, 1966, D 51,816
Int. Cl. G11b *15/28, 15/60*
U.S. Cl. 242—209 2 Claims

ABSTRACT OF THE DISCLOSURE

A magnetic tape device comprising a recording-and reproducing-means, and a base plate. Two reel plates are supported by the base plate and spaced apart from each other. At least one of the reel plates is adapted to be rotated. The recording-and reproducing means includes a tape. Two reels are mounted on corresponding of the reel plates. The tape is wound on one of the reels and rewound on the other of the reels. A plurality of elements comprises means for guiding the tape from one to the other of the reels. Magnet heads are disposed adjacent the tape during the guidance of the tape, and a driven roller engages the tape. The elements are disposed on the inside of the tape, the latter forming in the direction of the tape movement a bow shape relative to the reels and secured to the base plate. A capstan idler is disposed on the opposite side of the path of the tape. A cap means defines a guide face rising from the base plate up to the height of the capstan idler and is adapted for automatic lifting of the tape over the capstan idler, upon laying the tape in a loose bow from one of the reels to the other of the reels in front of the capstan idler and tensioned due to rotation of the winding reel, and the driven roller is of an axial length upwardly greater than the width of the tape.

Figure 1:
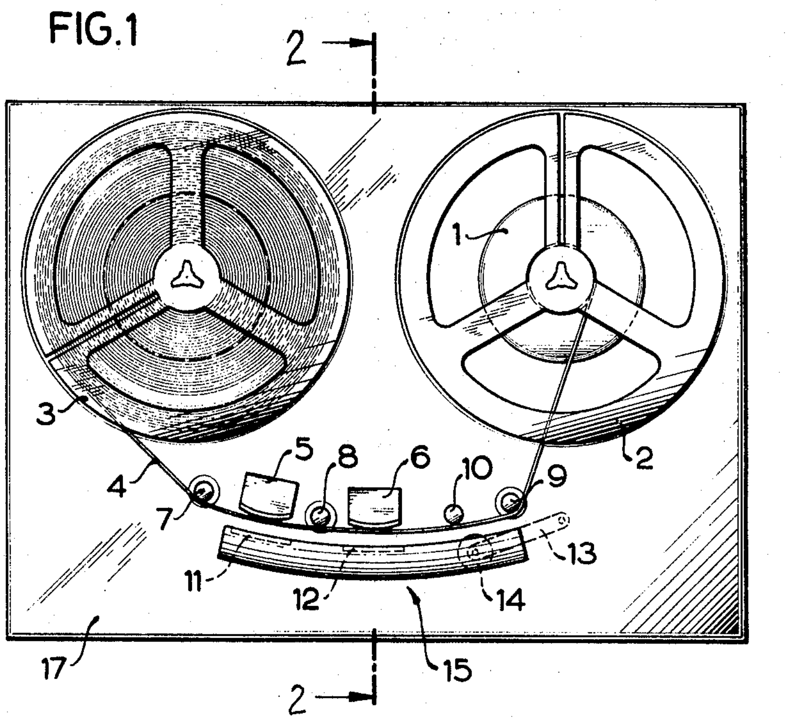

The present invention relates to a guide device for a tape-like recording carrier, in general, and to such guide device in a magnetophone for a tape-like recording carrier, in particular.

The tape-like recording carrier is capable of being rewound from one of two separately operable reels disposed in one plane, whereby the sound heads are disposed between the two reels on the inside of the recording carrier and at least one of two rollers is arranged on the outside, the recording carrier being capable of being clamped between the rollers for the purpose of transportation.

The recording carrier must be comparatively well directed in such arrangement of reels, sound heads and rollers with its start by the hand of an operator on the way from the full reel to the empty reel. The greatest obstacle is thereby the driving-roller and the capstan idler, respectively, since the recording carrier must be guided between the two from above and this movement is not arranged in the direction of the simple movement occurrence from reel to reel. In order to remove this drawback, it has been proposed before to arrange the capstan idler submergible or swingable upwardly, whereby the driving roller is arranged on the inner tape side. Since the capstan idler is pressed towards the driving roller, on the one hand, with comparatively great force, and, on the other hand, its axle must also be disposed exactly parallel to the driving roller, such position variation of the capstan idler requires comparatively high expenditure.

For a simplified introduction of the sound tape between the transporting roller and the capstan idler, whereby the winding-and unwinding reel of the sound tape is arranged in a common or joint box, guide strips have been used before. Since for structural reasons the distance between the capstan idler and the guide roller cannot be large, the introduction is in this manner simplified, however, applied to separately operable reels, the drawback of a guide movement in two different planes remains.

Furthermore, a box device is known, in which the box is slidable into the device for space-saving for the operation in the direction of its plane. Since this is not easily possible due to the driving pin and the sound heads, lateral guide faces are provided, which bring the box during insertion into a correspondingly high position and permit a lowering only upon reaching its operational position. The purpose of these obliquely rising guide faces does not reside in the fact to change a predetermined given movement direction forcibly into another, rather more in the fact to insert the box into a high position complementary to one of the driving parts into the device and to permit its lowering in the operational position only, that means, a horizontally arranged guide face would serve the same purpose. Since the device is destined for a mounting on the dashboard in an automotive vehicle, where the space is very limited as to its height, the inclination of the guide strip should serve exclusively for the widening of the inserting slot, and in particular in the direction downwardly to the device, thus, without additional space required for the function of the insertion. Obliquely disposed guide faces of this type are not suitable to simplify an operational process occurring in two planes. Furthermore, for the removal of the tape and the box, respectively, from the operational position, a particular lifting device is required.

Furthermore, a device is known, in which the start of the sound tape is inserted and which guides then by predetermined conveying means the sound tape automatically to the empty reel. The introduction process is though simplified in this case, however, a comparatively complicated device is required therefor.

It is one object of the present invention to provide a simple guide device for a tape-like recording carrier, which permits the operator to guide the sound tape end from the wound reel to the empty reel by practically unhindered movement in one plane.

It is another object of the present invention to provide a guide device for a tape-like recording carrier, wherein the structural elements, which are disposed on its outside upon insertion of the recording carrier, are equipped with guide members such, that the recording carrier during its movement in the plane of the reels is lifted perpendicularly thereto, until it arrives at the height of the upper edge of the structural elements.

Figure 2:
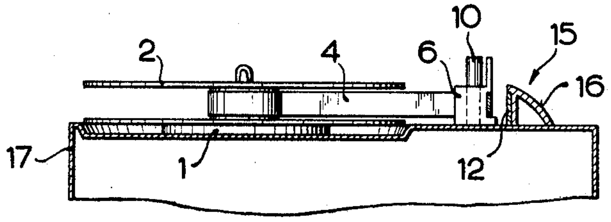

With these and other objects in view, which will become apparent in the following detailed description, the present invention will be clearly understood in connection with the accompanying drawing, in which:

FIGURE 1 is a schematic top plan view of a sound tape device, designed in accordance with the present invention; and FIG. 2 is a section along the lines 2—2 of FIG. 1.

Referring now to the drawing, the device comprises two reel plates 1 on which two individual reels 2 and 3 can be mounted. A recording carrier 4 leads over magnet heads 5 and 6, guide pins 7, 8 and 9 and a driven driven roller 10, all of which are disposed on its inside.

Screening sheets 11 and 12 and a capstan idler 14 swingable on a lever are arranged on the outside of the tape in front of the magnet heads 5 and 6. The screening sheets 11 and 12 and the capstan idler 14 are covered over by a cap 15, which has an oblique face 16 towards the outer edge of the device. The guide parts 7, 8 and 9 and the driven roller 10 disposed on the inside of the recording carrier 4, are extended upwardly beyond the normal width of the recording carrier 4.

If the recording carrier 4, upon mounting of the full reel 3, is guided in its plane in a curve to the core of the empty reel 2, it lies at first uncontrolled in this plane on the base plate 17 of the device. Upon rotation of the reel 2, it becomes tight and slides on the inclined face 16 of the cap 15, upwardly, until it reaches an engagement on the extended sections of the guide parts 7, 8 and 9 and the roller 10. Upon further movement of the reel 2, the recording carrier 4 slides downwardly into its operating position. Save the winding of the recording carrier 4 about the core of the reel 2, thus practically nothing more has to be done by the operator.

While I have disclosed one embodiment of the present invention it is to be understood that this embodiment is given by example only and not in a limiting sense, the scope of the present invention being determined by the objects and the claims.

I claim:

1. A magnetic tape device, comprising:
a recording-and reproducing-means,
a base plate,
two reel plates supported by said base plate and spaced apart from each other,
at least one of said reel plates being adapted to be rotated,
the recording-and reproducing-means including a tape,
two reels mounted on corresponding of said reel plates,
said tape being wound on one of said reels and rewound on the other of said reels,
a plurality of elements comprising means for guiding said tape from one to the other of said reels,
magnet heads disposed adjacent said tape during the guidance of said tape,
a driven roller engaging said tape,
said elements being disposed on the inside of said tape, the latter forming in the direction of the tape movement a bow shaped relative to said reels and secured to said base plate,
a capstan idler on the opposite side of the path of said tape,
a cap means defining a guide face rising from said base plate up to the height of said capstan idler and adapted for automatic lifting of said tape over said capstan idler, upon laying said tape in a loose bow from one of said reels to the other of said reels in front of said capstan idler and tensioned due to rotation of the winding reel, and
said driven roller being of an axial length upwardly greater than the width of said tape.

2. The magnetic tape device, as set forth in claim 1, wherein:
said capstan idler is disposed opposite said driven roller for intermediate clamping of said tape,
screening sheets disposed opposite the end face of said magnet heads,
said capstan idler and said screening sheets being disposed on said base plate, such to form a bow open to said reels as a tape path, and
said magnet heads having guide faces leading upwardly to form said tape path and extending to a height greater than the width of said tape.

References Cited

UNITED STATES PATENTS

| | | | |
|---|---|---|---|
| 2,017,855 | 10/1935 | Foster et al. | 352—158 |
| 3,006,650 | 10/1961 | Ellmore | 274—4 |
| 3,218,397 | 11/1965 | Pastor. | |
| 3,254,858 | 6/1966 | Camras et al. | 242—55.13 |

LEONARD D. CHRISTIAN, Primary Examiner

U.S. Cl. X.R.

242—76; 352—157